(12) United States Patent
Jaouen

(10) Patent No.: US 12,437,056 B2
(45) Date of Patent: Oct. 7, 2025

(54) TRANSACTION PROCESS BETWEEN AN APPLICATION AND A DEVICE

(71) Applicant: STMicroelectronics (Grand Ouest) SAS, Le Mans (FR)

(72) Inventor: Michel Jaouen, Yvre l'Eveque (FR)

(73) Assignee: STMICROELECTRONICS (GRAND OUEST) SAS, Le Mans (FR)

(*) Notice: Subject to any disclaimer, the term of this patent is extended or adjusted under 35 U.S.C. 154(b) by 235 days.

(21) Appl. No.: 18/048,940

(22) Filed: Oct. 24, 2022

(65) Prior Publication Data

US 2023/0127971 A1    Apr. 27, 2023

(30) Foreign Application Priority Data

Oct. 25, 2021 (FR) .................................. 2111294

(51) Int. Cl.
*G06F 21/54* (2013.01)
*G06F 9/30* (2018.01)
*G06F 21/55* (2013.01)

(52) U.S. Cl.
CPC .......... *G06F 21/54* (2013.01); *G06F 9/30101* (2013.01); *G06F 21/554* (2013.01)

(58) Field of Classification Search
CPC ..... G06F 21/54; G06F 9/30101; G06F 21/554
See application file for complete search history.

(56) References Cited

U.S. PATENT DOCUMENTS

| | | | |
|---|---|---|---|
| 6,671,802 B1* | 12/2003 | Ott ...................... | G06F 9/44505 713/100 |
| 2011/0150126 A1* | 6/2011 | Lamon ................... | H04B 3/548 375/295 |
| 2019/0172047 A1* | 6/2019 | Tan ......................... | G06F 21/32 |
| 2020/0125756 A1 | 4/2020 | Hampel et al. | |
| 2021/0160134 A1 | 5/2021 | Anquet et al. | |
| 2021/0184928 A1* | 6/2021 | Lal ....................... | H04L 41/5048 |
| 2021/0303372 A1* | 9/2021 | Santoni ............... | G06F 11/1629 |
| 2022/0202290 A1* | 6/2022 | Hua ..................... | A61B 5/01 |
| 2022/0244883 A1* | 8/2022 | Hung .................... | G06F 3/0655 |
| 2023/0068102 A1* | 3/2023 | Bavishi ............... | G06F 12/1408 |
| 2023/0289424 A1* | 9/2023 | Wang ..................... | G06F 21/60 |

* cited by examiner

*Primary Examiner* — Linglan Edwards
*Assistant Examiner* — Jacob Benedict Knackstedt
(74) *Attorney, Agent, or Firm* — Slater Matsil, LLP

(57) ABSTRACT

In accordance with an embodiment, a method for transaction between an application executed by a processor and a peripheral via a hardware abstraction layer includes: configuring the peripheral comprising writing a transaction configuration emitted by the application into configuration registers of the peripheral via the hardware abstraction layer; verifying compliance of the transaction configuration written in the configuration registers; and executing the transaction only when the transaction configuration written in the configuration registers is compliant based on the verifying.

7 Claims, 3 Drawing Sheets

TRANSACTION PROCESS BETWEEN AN APPLICATION AND A DEVICE

CROSS-REFERENCE TO RELATED APPLICATIONS

This application claims the benefit of French Patent Application No. 2111294, filed on Oct. 25, 2021, which application is hereby incorporated herein by reference.

TECHNICAL FIELD

Embodiments and implementations relate a transaction process between an application and a device.

BACKGROUND

A system-on-chip generally includes a processor and peripherals, in particular memories. The processor is configured to execute a given application. The application can provide one or more services that can be implemented when the application is executed by the processor.

It is common to use a hardware abstraction layer (also known by the acronym HAL) between the application and the hardware peripherals. This layer is middleware providing standardized peripheral manipulation functions while hiding technical details of the peripheral implementation.

The hardware abstraction layer is used as an intermediary in the transactions between the application implemented by the processor and accesses to peripheral registers. In particular, the hardware abstraction layer can be configured to write a transaction configuration to peripheral configuration registers. The configuration registers of a peripheral allow an application to interact with that peripheral through the hardware abstraction layer.

Moreover, a misguided person can carry out a fault injection attack on the system-on-chip in order to disrupt, or even make uncontrollable, the execution of an application. In particular, a fault injection attack can be executed in order to modify the values in the registers of the peripherals. This can create security issues for the system-on-chip.

For example, a fault injection attack can be executed in order to modify the values of a block of a flash memory. Such fault injection attacks can be used to cause a wrong operation to be performed by the peripherals. A fault injection attack can also be performed on a direct memory access controller to insecurely transfer data from the memory. A fault injection attack can also be performed to modify a key used by a cryptography circuit.

The hardware abstraction layer can be adapted to verify the transaction configuration it receives from the application to ensure that the transaction configuration is correct before writing it to the peripheral configuration registers. However, such verification is insufficient if a fault injection attack is implemented on the peripheral configuration registers after this verification.

In order to prevent fault injection attacks, it is possible to execute program instructions by adding random delays between instruction executions. Such random delays make it difficult to repeat fault injection attacks.

However, this solution has several disadvantages. First of all, this solution does not provide sufficient robustness with respect to advanced fault injection attacks. In particular, it is possible to repeat a fault injection attack by observing the power consumption of the system-on-chip. Another disadvantage is that the use of random delays does not allow the detection of a fault injection attack. Thus, it is not possible to know when a bad transaction has been made following such an attack. Furthermore, adding random delays in the program execution slows it down. Thus, such a solution is not always suitable for real-time systems.

There is therefore a need to propose a solution allowing to detect attacks by fault injection during transactions between an application and a peripheral.

SUMMARY

In accordance with an embodiment, a method for transaction between an application executed by a processor and a peripheral via a hardware abstraction layer includes: configuring the peripheral comprising writing a transaction configuration emitted by the application into configuration registers of the peripheral via the hardware abstraction layer; verifying compliance of the transaction configuration written in the configuration registers; and executing the transaction only when the transaction configuration written in the configuration registers is compliant based on the verifying.

In accordance with another embodiment, a system includes a processor configured to execute an application and a peripheral that includes configuration registers. The application is configured to communicate with the peripheral via a hardware abstraction layer, where: the hardware abstraction layer is adapted to configure the peripheral for a transaction by writing, in the configuration registers, a transaction configuration emitted by the application; the hardware abstraction layer and the peripheral are adapted to verify compliance of the transaction configuration written in the configuration registers; and the peripheral is adapted to execute the transaction only when the transaction configuration written in the configuration registers is compliant.

In accordance with a further embodiment, a circuit includes a cryptographic circuit having a configuration register, and a processor configured to execute a hardware abstraction layer and an application configured to communicate with the cryptographic circuit via the hardware abstraction layer. The hardware abstraction layer is adapted to configure the cryptographic circuit for a transaction by writing, in the configuration registers, a cryptography key provided by the application, and the cryptographic circuit is configured to generate a hash value in a register of the cryptographic circuit after the configuration of the cryptographic circuit based on the cryptography key written in the configuration registers. The hardware abstraction layer is further configured to read the hash value written in the register of the cryptographic circuit, and calculate a first transformed hash value from the read hash value, and the cryptographic circuit is further adapted to calculate a second transformed hash value from the hash value written in the register of the cryptographic circuit, compare the first transformed hash value calculated by the hardware abstraction layer with the second transformed hash value calculated by the cryptographic circuit, and execute the transaction only when the first transformed hash value calculated by the hardware abstraction layer is equal to the second transformed hash value calculated by the cryptographic circuit.

BRIEF DESCRIPTION OF THE DRAWINGS

Other advantages and features of the invention will appear upon examining the detailed description of non-limiting implementations and embodiments and of the appended drawings wherein.

DETAILED DESCRIPTION OF ILLUSTRATIVE EMBODIMENTS

Figure 1:
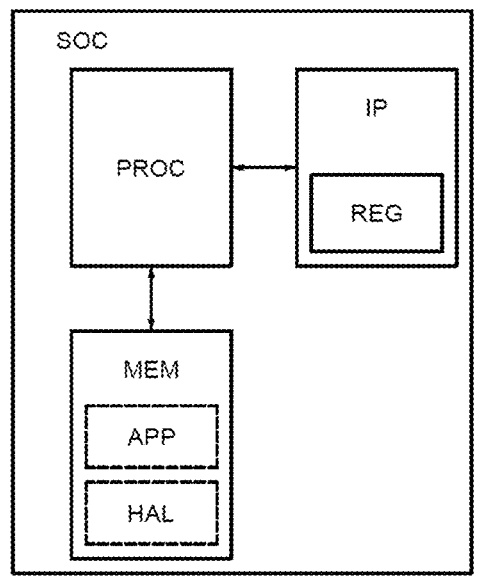
FIG. 1 illustrates a system-on-chip SOC according to one embodiment.

Embodiments and implementations relate to securing certain aspects of a system-on-chip, such as transactions between a processor and a peripheral of the system-on-chip, in particular with respect to security against fault injection attacks.

According to one aspect, provision is made of a method for transaction between an application executed by a processor and a peripheral via a hardware abstraction layer, the method comprising: a configuration of the peripheral wherein a transaction configuration emitted by the application is written in peripheral configuration registers via the hardware abstraction layer; then a verification of compliance of the transaction configuration recorded in the peripheral configuration registers; then an execution of the transaction only if the transaction configuration recorded in the peripheral configuration registers is compliant.

Such a method is implemented before performing a transaction. It allows the verification of whether the transaction configuration defined in the peripheral configuration registers by the hardware abstraction layer has not been modified before performing the transaction. The method thus allows the detection of a fault injection attack on the peripheral configuration registers.

In various embodiments, the peripheral can be a flash memory, a direct memory access controller or a cryptography circuit for example. In the case where the peripheral is a cryptography circuit, the transaction configuration can be a cryptography key.

In an advantageous implementation, the method further includes emitting, by the peripheral, a warning signal to the application if the transaction configuration is not compliant, in order to indicate to the application that the transaction is not performed. This lets the application know that a transaction has not been performed so that it can renew it.

In an advantageous implementation, the verification of the compliance of the transaction configuration recorded in the peripheral configuration registers includes: a reading by the hardware abstraction layer of the transaction configuration recorded in the peripheral configuration registers; then a calculation by the hardware abstraction layer of a transaction configuration transformed from the transaction configuration read; a calculation by the peripheral of a transaction configuration transformed from the transaction configuration recorded in the peripheral configuration registers; and a comparison between the transformed transaction configuration calculated by the hardware abstraction layer and the transformed transaction configuration calculated by the peripheral.

In an embodiment, the transaction is then executed only if the transformed transaction configuration calculated by the hardware abstraction layer is equal to the transformed transaction configuration calculated by the peripheral.

Advantageously, the verification of the compliance of the transaction configuration recorded in the peripheral configuration registers further includes: a generation of a random value in a peripheral register after said configuration of the peripheral; then a reading by the hardware abstraction layer of the random value recorded in a peripheral register; then a calculation by the hardware abstraction layer of a transformed random value from the random value read; and a calculation by the peripheral of a transformed random value from the random value recorded in a peripheral register; a comparison between the transformed random value calculated by the hardware abstraction layer and the transformed random value calculated by the peripheral.

The transaction is then executed only if the transformed random value calculated by the hardware abstraction layer is equal to the transformed random value calculated by the peripheral.

According to another aspect, provision is made of a system-on-chip that includes: a processor configured to execute an application; a peripheral comprising configuration registers, the application being configured to communicate with the peripheral via a hardware abstraction layer. The hardware abstraction layer is adapted to configure the peripheral for a transaction by writing, in the peripheral configuration registers, a transaction configuration emitted by the application; the hardware abstraction layer and the peripheral are adapted to verify compliance of the transaction configuration recorded in the peripheral configuration registers; and the peripheral is adapted to execute the transaction only if the transaction configuration recorded in the peripheral configuration registers is compliant. The system-on-chip may be disposed, for example, on a single integrated circuit or a single semiconductor substrate, such as a semiconductor substrate.

In an advantageous embodiment, the peripheral is configured to emit a warning signal to the application if the transaction configuration is not compliant so as to indicate to the application that the transaction is not performed.

Advantageously, to verify the compliance of the transaction configuration recorded in the peripheral configuration registers, the hardware abstraction layer is configured to: read the transaction configuration recorded in the peripheral configuration registers; then calculate a transformed transaction configuration from the transaction configuration read. The peripheral is configured to: calculate a transformed transaction configuration from the transaction configuration recorded in the peripheral configuration registers; compare between the transformed transaction configuration calculated by the hardware abstraction layer and the transformed transaction configuration calculated by the peripheral. The peripheral is adapted to execute the transaction only if the transformed transaction configuration calculated by the hardware abstraction layer is equal to the transformed transaction configuration calculated by the peripheral.

In an embodiment, to verify the compliance of the transaction configuration recorded in the peripheral configuration registers, the peripheral is further adapted to generate a random value in a peripheral register after the configuration of the peripheral. In addition, the hardware abstraction layer is further configured to: read the random value recorded in a peripheral register, then calculate a transformed random value from the random value read. The peripheral is further adapted to: calculate a transformed random value from the random value recorded in a peripheral register, and compare the transformed random value calculated by the hardware abstraction layer with the transformed random value calculated by the peripheral. In an embodiment, the peripheral is adapted to execute the transaction only if the transformed random value calculated by the hardware abstraction layer is equal to the transformed random value calculated by the peripheral.

FIG. 1 illustrates a system-on-chip SOC according to one embodiment. The system-on-chip SOC comprises a processor PROC and at least one peripheral IP. Here, only one peripheral is shown. However, of course, the system-on-chip may comprise several peripherals. The peripheral can be a flash memory, a direct memory access controller or a cryptography circuit for example.

The processor is configured to execute an application APP. The application APP may provide one or more services that can be implemented upon execution of the application APP by the processor. The application APP is recorded in a non-volatile memory MEM.

The peripheral IP comprises registers REG comprising configuration registers. The configuration registers are configured to record a transaction configuration before each transaction. In the case where the peripheral is a cryptography circuit, the transaction configuration can be a cryptography key.

A hardware abstraction layer HAL is provided between the application APP and the registers REG of the peripheral IP. The application APP is configured to require the hardware abstraction layer HAL to interact with the registers of the peripheral IP. The hardware abstraction layer HAL is a software layer recorded in the memory MEM.

The hardware abstraction layer HAL thus acts as an intermediary in the transactions between the application APP and the registers of the peripheral IP.

The system-on-chip is configured to implement a method for transaction between the application APP and the peripheral IP.

FIGS. 2 to 5 illustrate one implementation of such a transaction method.

Figure 2:
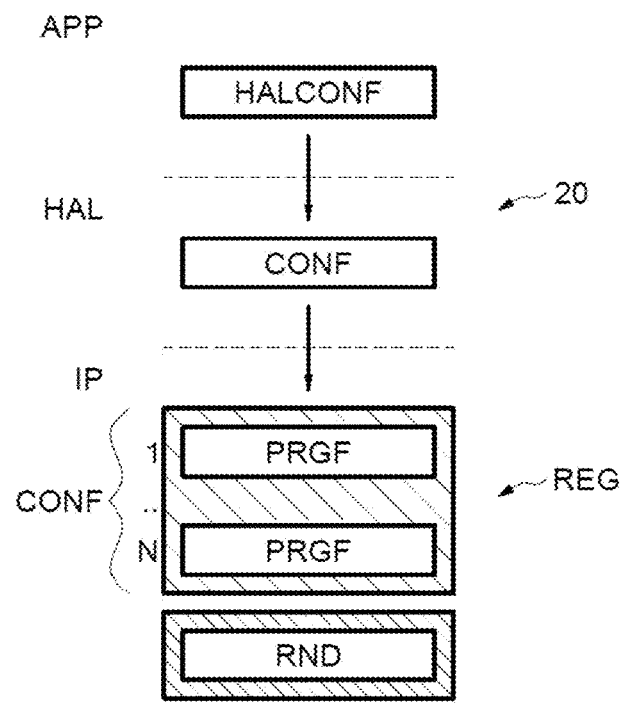
FIGS. 2, 3, 4 and 5 schematically illustrate embodiments and implementations of the invention.

The method comprises a step 20, illustrated in FIG. 2, wherein the application APP requires the hardware abstraction layer HAL to perform a transaction with the peripheral IP.

In particular, the application APP transmits to the hardware abstraction layer HAL a transaction configuration HALCONF, then the hardware abstraction layer HAL translates this transaction configuration and writes the translated transaction configuration CONF in the configuration registers PRGF of the peripheral IP. The peripheral IP then generates a random value RND in one of its registers. If the peripheral is a cryptography circuit, the translated transaction configuration CONF can be a hash value of the cryptography key (that is to say the result of a hash function taking the cryptography key as input).

Figure 3:
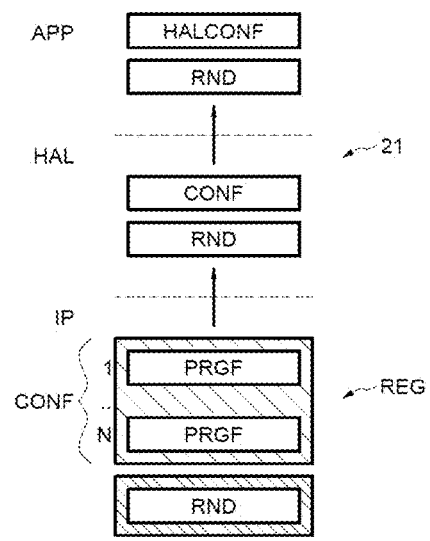

The method then comprises a step 21, illustrated in FIG. 3, wherein the hardware abstraction layer HAL reads the transaction configuration CONF written in the configuration registers of the peripheral IP. The hardware abstraction layer HAL translates this transaction configuration then transmits its translation HALCONF to the application APP. The hardware abstraction layer HAL also reads the register comprising the random value RND then transmits this random value RND to the application APP. If the peripheral is a cryptography circuit, the hardware abstraction layer reads the hash value of the cryptography key which it then transmits to the application, so that the latter can control it.

Figure 4:
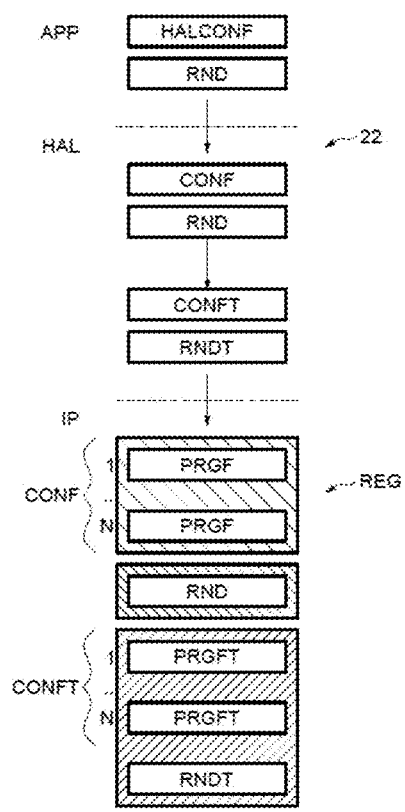

The method then comprises a step 22, illustrated in FIG. 4, wherein the application APP transmits to the hardware abstraction layer HAL the transaction configuration HALCONF and the random value RND received in step 21. If the peripheral is a cryptography circuit, the application APP transmits to the hardware abstraction layer HAL the hash value of the cryptography key received in step 21.

The hardware abstraction layer HAL then translates this transaction configuration and calculates a transformed transaction configuration CONFT from the translated transaction configuration CONF. For example, the hardware abstraction layer HAL can calculate a one's complement of the translated transaction configuration CONF.

The hardware abstraction layer HAL can also perform a transformation of the received random value RND to obtain a transformed random value RNDT. For example, the hardware abstraction layer HAL can calculate a one's complement of the random value.

Then, the hardware abstraction layer HAL writes the transformed transaction configuration CONFT and the random value RND or the transformed random value RNDT in registers of the peripheral IP. Here, the hardware abstraction layer HAL writes the transformed transaction configuration CONFT into registers PRGFT of the peripheral IP and the transformed random value RNDT into another register of the peripheral IP.

If the peripheral is a cryptography circuit, the hardware abstraction layer HAL calculates a transformed hash value of the cryptography key from the hash value transmitted by the application APP, then writes this transformed hash value in the peripheral IP registers.

Figure 5:
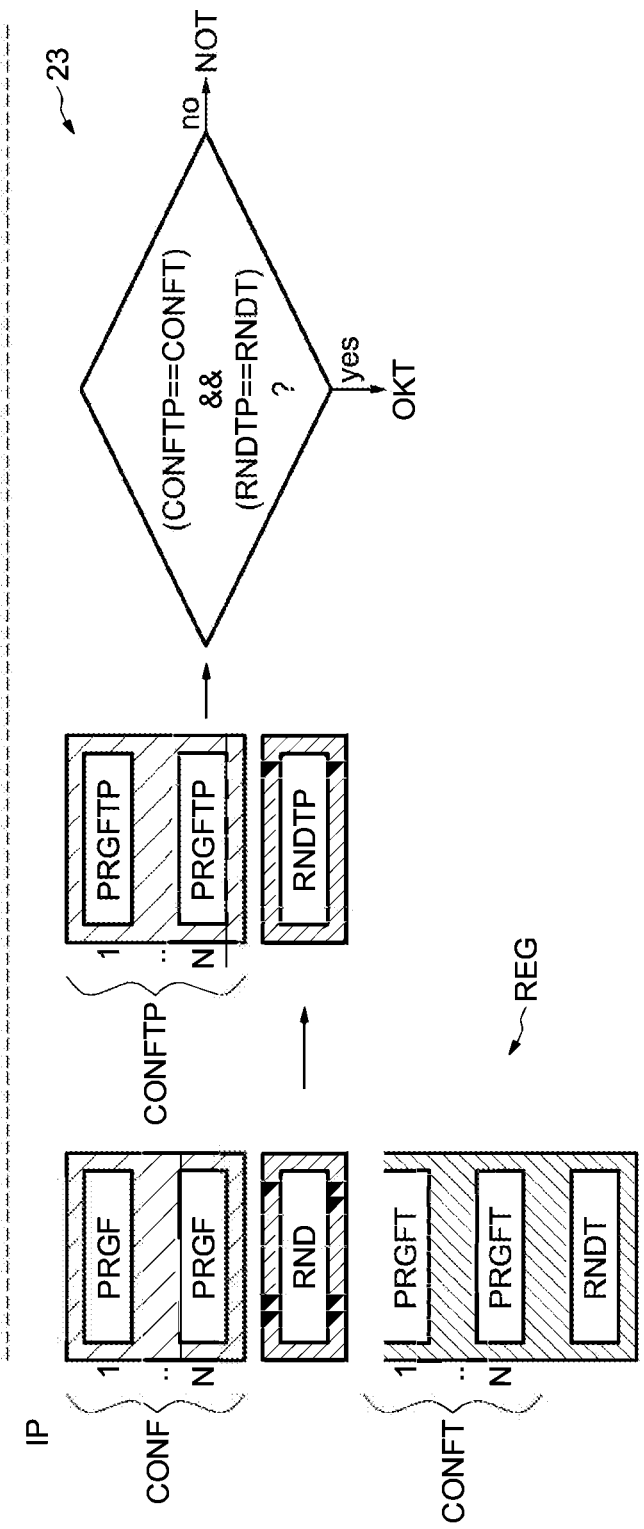

The method then comprises a step 24, illustrated in FIG. 5, where the peripheral IP calculates a transformed transaction configuration CONFTP from the configuration CONF recorded in the configuration registers PRGF of the peripheral IP. This transformed transaction configuration CONFTP is calculated in the same way as the transaction configuration CONFT calculated previously by the hardware abstraction layer HAL. For example, the peripheral IP may calculate a one's complement of the transaction configuration CONF recorded in the configuration registers of the peripheral IP.

To calculate the transformed transaction configuration COM, 1P, the peripheral IP comprises a circuit (not shown) configured to perform this calculation. For example, the circuit can be configured to generate a one's complement of the transformed configuration recorded in the configuration registers.

In the event that the hardware abstraction layer HAL has previously calculated a transformed random value RNDT, the peripheral IP also calculates a transformed random value RNDTP from the random value RND generated by the peripheral IP in step 20.

The transformed transaction configuration CONFTP calculated by the peripheral IP and the transformed transaction configuration CONFT calculated by the hardware abstraction layer HAL are then compared by the peripheral IP. Similarly, the random value RND generated by the peripheral IP or the transformed random value RNDTP calculated by the peripheral IP is then compared to the random value or the transformed random value RNDT written by the abstraction layer in the registers of the peripheral IP. Here, it is the transformed random value RNDTP calculated by the peripheral IP which is compared to the transformed random value RNDT written by the abstraction layer in the registers of the peripheral IP.

If the transform configuration CONFTP calculated by the peripheral IP is equal to the transformed transaction configuration CONFT calculated by the hardware abstraction layer HAL are equal and if the random value generated by the peripheral IP or the random value RNDTP transformed by the peripheral IP is equal to the random value or to the transformed random value RNDT written by the abstraction layer in the registers of the peripheral IP, then the transaction is authorized by the peripheral (OKT). Otherwise, the transaction is refused (NOT).

In particular, if the peripheral is a cryptography circuit, the peripheral IP calculates a transformed hash value of the cryptography key from the hash value recorded in the configuration registers PRGF of the peripheral IP, then compares the transformed hash value calculated by the peripheral IP and the transformed hash value calculated by the hardware abstraction layer HAL.

Thus, a transaction cannot be performed only in case of equality between the transformed transaction configurations CONFTP and CONFT and between the random fields or the transformed random fields RNDT, RNDTP.

It is then possible to prevent execution of a transaction when a fault injection attack intervenes to modify the transaction configuration CONF written in the configuration registers. Indeed, a modification of the transaction configuration in the configuration registers of the peripheral IP can be detected thanks to the comparison carried out.

In particular, as seen above, the transaction configuration CONF recorded in the configuration registers is read by the hardware abstraction layer HAL in step 21. This read configuration is then used to calculate a transformed transaction configuration CONFT which is subsequently compared with a transformed transaction configuration CONFTP calculated from the transaction configuration CONF recorded in the comparison registers of the peripheral IP. Thus, a modification of the transaction configuration CONF recorded in the registers implies that the transformed transaction configuration CONFTP calculated by the peripheral IP is different from the transformed transaction configuration CONFT calculated by the hardware abstraction layer HAL. The comparison then allows the detection of the difference between the transformed transaction configurations CONFTP, CONFT. The comparison thus allows the evaluation of whether the transaction configuration CONF recorded in the configuration registers of the peripheral IP is indeed the desired one before performing the transaction. It is therefore thus possible to detect a fault injection attack.

Thus, such a method prevents the peripheral IP from performing an uncontrolled transaction from an undesired configuration.

The method may also comprise, if a difference between the transformed transaction configurations CONFTP, CONFT is detected, an emission of a warning signal by the peripheral IP allowing to indicate to the application APP that the transaction is not performed. In this way, the application APP can know that a transaction has not been executed and can then renew the transaction.

What is claimed is:

1. A circuit comprising:
a cryptographic circuit comprising configuration registers; and
a processor configured to execute a hardware abstraction layer and an application configured to communicate with the cryptographic circuit via the hardware abstraction layer, wherein:
the hardware abstraction layer is configured to configure the cryptographic circuit for a transaction by writing, in the configuration registers, a cryptography key provided by the application,
the cryptographic circuit is configured to generate a hash value in a register of the cryptographic circuit after the configuration of the cryptographic circuit based on the cryptography key written in the configuration registers, and
the hardware abstraction layer is further configured to:
read the hash value written in the register of the cryptographic circuit, and calculate a first transformed hash value from the read hash value by calculating a one's complement of the read hash value, and
the cryptographic circuit is further configured to
calculate a second transformed hash value from the hash value written in the register of the cryptographic circuit by calculating the one's complement of the hash value written in the register of the cryptographic circuit,
compare the first transformed hash value calculated by the hardware abstraction layer with the second transformed hash value calculated by the cryptographic circuit, and
execute the transaction only when the first transformed hash value calculated by the hardware abstraction layer is equal to the second transformed hash value calculated by the cryptographic circuit.

2. The circuit of claim 1, wherein the cryptographic circuit and the processor are disposed on a single semiconductor substrate.

3. A circuit comprising:
a cryptographic circuit comprising configuration registers; and
a processor configured to execute a hardware abstraction layer and an application configured to communicate with the cryptographic circuit via the hardware abstraction layer, wherein:
the hardware abstraction layer is configured to configure the cryptographic circuit for a transaction by writing, in the configuration registers, a cryptography key provided by the application,
the cryptographic circuit is configured to generate a hash value in a register of the cryptographic circuit after the configuration of the cryptographic circuit based on the cryptography key written in the configuration registers, and
the hardware abstraction layer is further configured to:
read the hash value written in the register of the cryptographic circuit, and calculate a first transformed hash value from the read hash value by calculating a one's complement of the read hash value, and
the cryptographic circuit is further configured to
calculate a second transformed hash value from the hash value written in the register of the cryptographic circuit by calculating the one's complement of the hash value written in the register of the cryptographic circuit,
compare the first transformed hash value calculated by the hardware abstraction layer with the second transformed hash value calculated by the cryptographic circuit, and
execute the transaction only when the first transformed hash value calculated by the hardware abstraction layer is equal to the second transformed hash value calculated by the cryptographic circuit, wherein the cryptographic circuit and the processor are disposed on a single semiconductor substrate.

4. The circuit of claim 3, wherein the processor is configured to emit a warning signal to the application in response to the first transformed hash value calculated by the hardware abstraction layer not being equal to the second transformed hash value calculated by the cryptographic circuit to indicate to the application that the transaction is not performed.

5. A method of operating a cryptographic circuit comprising configuration registers; and a processor configured to execute a hardware abstraction layer and an application configured to communicate with the cryptographic circuit via the hardware abstraction layer, the method comprising:
configuring, by the hardware abstraction layer, the cryptographic circuit for a transaction by writing, in the configuration registers, a cryptography key provided by the application;
after configuring the cryptographic circuit, generating, by the cryptographic circuit, a hash value in a register of the cryptographic circuit based on the cryptography key written in the configuration registers;
reading, by the hardware abstraction layer, the hash value written in the register of the cryptographic circuit;
calculating, by hardware abstraction layer, a first transformed hash value from the read hash value by calculating a one's complement of the read hash value;
calculating, by the cryptographic circuit, a second transformed hash value from the hash value written in the register of the cryptographic circuit by calculating the one's complement of the hash value written in the register of the cryptographic circuit;
comparing, by the cryptographic circuit, the first transformed hash value calculated by the hardware abstraction layer with the second transformed hash value calculated by the cryptographic circuit; and
executing the transaction only when the first transformed hash value calculated by the hardware abstraction layer is equal to the second transformed hash value calculated by the cryptographic circuit.

6. The method of claim 5, further comprising emitting a warning signal to the application in response to the first transformed hash value calculated by the hardware abstraction layer not being equal to the second transformed hash value calculated by the cryptographic circuit to indicate to the application that the transaction is not performed.

7. The method of claim 5, wherein the cryptographic circuit and the processor are disposed on a single semiconductor substrate.

* * * * *